United States Patent
Wen et al.

(10) Patent No.: US 9,699,132 B2
(45) Date of Patent: Jul. 4, 2017

(54) METHOD, APPARATUS, AND SYSTEM FOR EXCHANGING ELECTRONIC BUSINESS CARD

(71) Applicant: TENCENT TECHNOLOGY (SHENZHEN) COMPANY LIMITED, Shenzhen, Guangdong (CN)

(72) Inventors: Xiaomu Wen, Guangdong (CN); Yu Chen, Guangdong (CN); Jing He, Guangdong (CN); Junshan Wang, Guangdong (CN); Bin Li, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 468 days.

(21) Appl. No.: 14/302,919

(22) Filed: Jun. 12, 2014

(65) Prior Publication Data

US 2014/0359038 A1 Dec. 4, 2014

Related U.S. Application Data

(63) Continuation of application No. PCT/CN2014/070670, filed on Jan. 15, 2014.

(30) Foreign Application Priority Data

May 30, 2013 (CN) .......................... 2013 1 0209817

(51) Int. Cl.
*G06F 15/16* (2006.01)
*H04L 12/58* (2006.01)
*H04L 9/32* (2006.01)

(52) U.S. Cl.
CPC ................ *H04L 51/28* (2013.01); *H04L 9/32* (2013.01); *H04L 9/3226* (2013.01);
(Continued)

(58) Field of Classification Search
CPC ........................ H04L 12/5865–12/5895; H04L 63/06–63/068; H04L 9/32; H04L 9/3226; H04L 51/20–51/32; H04L 63/083
See application file for complete search history.

(56) References Cited

U.S. PATENT DOCUMENTS 9,325,755 B1 * 4/2016 Abercrombie, III .. H04L 65/403
2009/0150489 A1 * 6/2009 Davis ................... G06Q 10/107
709/204

(Continued)

FOREIGN PATENT DOCUMENTS

CN 102333276 A 1/2012
CN 102905221 A 1/2013
(Continued)

OTHER PUBLICATIONS

International Search Report issued in corresponding International Application No. PCT/CN2014/070670 mailed Apr. 25, 2014.
(Continued)

*Primary Examiner* — Brenda Higa
(74) *Attorney, Agent, or Firm* — Haug Partners LLP; William S. Frommer

(57) ABSTRACT

Embodiments of the present disclosure disclose methods, apparatuses, and systems for exchanging electronic business card. One of the methods includes: receiving a first request message sent by a first terminal, wherein the first request message includes first condition information, a first electronic business card, and first location information of the first terminal; selecting a second request message from at least one request message received during a preset period of time, according to the first location information, the first condition information, and the time when the first request message was received; sending an electronic business card corresponding to the second request message to the first terminal; and sending the first electronic business card to a
(Continued)

second terminal, wherein the second request message was sent by the second terminal. The methods, the apparatuses, and the systems can be directed to simplify the process of exchanging electronic business cards.

18 Claims, 5 Drawing Sheets

(52) U.S. Cl.
CPC .......... *H04L 12/5865* (2013.01); *H04L 51/20* (2013.01); *H04L 51/22* (2013.01)

(56) References Cited

U.S. PATENT DOCUMENTS

| | | | | |
|---|---|---|---|---|
| 2011/0243553 | A1* | 10/2011 | Russell | G06Q 30/0631 398/25 |
| 2012/0047152 | A1* | 2/2012 | Purdy | G06Q 30/0204 707/754 |
| 2013/0268594 | A1* | 10/2013 | Kogut | G06F 17/30867 709/204 |
| 2013/0339446 | A1* | 12/2013 | Balassanian | G06F 15/17306 709/204 |
| 2014/0115499 | A1* | 4/2014 | Parra | H04L 65/403 715/753 |
| 2014/0215212 | A1* | 7/2014 | Dempster | G06F 21/6245 713/168 |
| 2015/0058059 | A1* | 2/2015 | Kahan | G06Q 10/1095 705/7.19 |
| 2015/0066983 | A1* | 3/2015 | Sako | G06F 17/30044 707/770 |

FOREIGN PATENT DOCUMENTS

| | | |
|---|---|---|
| CN | 103095347 A | 5/2013 |
| CN | 103281236 A | 9/2013 |

OTHER PUBLICATIONS

Office Action issued in corresponding Chinese application 20131029817.5 mailed Dec. 3, 2014.

* cited by examiner

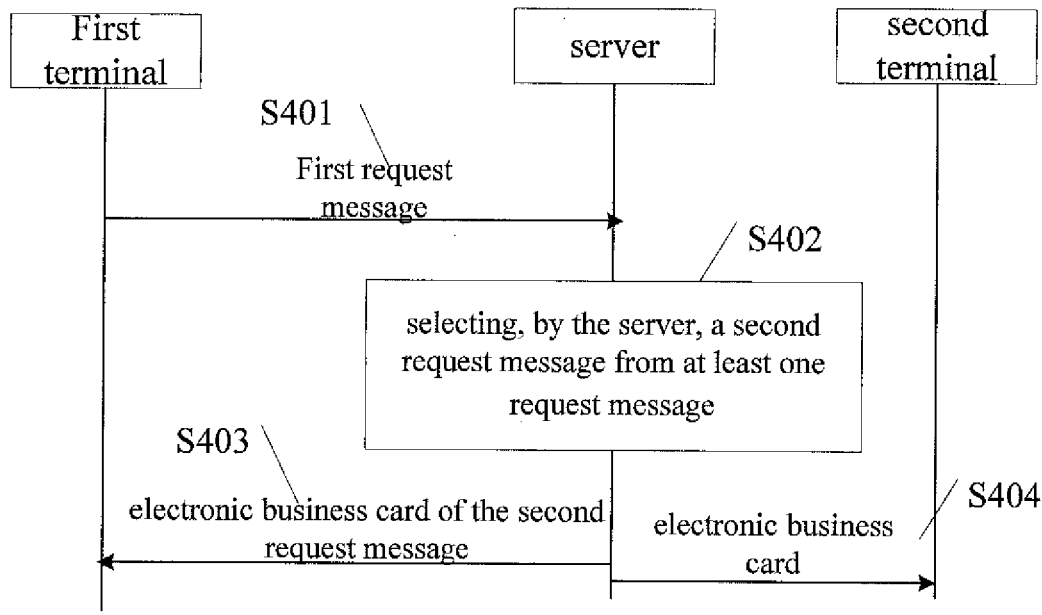

sending a first request message for requesting for exchanging of electronic business cards to a server, the first request message includes a first condition information, a first electronic business card, and a first location information of the first terminal, such that the server selects a second request message from at least one request message received during a preset period of time, according to the first location information, the first condition information, and the time when the first request message was received, and sending the first electronic business card to the second terminal, the second request message being sent by the second terminal — S301 receiving an electronic business card corresponding to the second request message sent by the server — S302

FIG. 3

First terminal | server | second terminal

S401 First request message

S402 selecting, by the server, a second request message from at least one request message S403 electronic business card of the second request message S404 electronic business card

FIG. 4

METHOD, APPARATUS, AND SYSTEM FOR EXCHANGING ELECTRONIC BUSINESS CARD

CROSS REFERENCE TO RELATED APPLICATIONS

This application is a U.S. continuation application under U.S.C. §111(a) claiming priority under U.S.C. §§120 and 365(c) to International Application No. PCT/CN2014/070670, filed on Jan. 15, 2014, which claims the priority benefit of Chinese Patent Application No, 201310209817.5, filed on May 30, 2013, the content of which is incorporated by reference herein in its entirety for all purposes.

FIELD OF THE TECHNICAL

The present disclosure relates to communication technology, and more particularly to methods, apparatuses, and systems for exchanging electronic business cards.

BACKGROUND

Nowadays, business cards are widely used in daily life. For example, people often exchange business cards when they meet clients and friends. In existing technology, a business card is generally made of paper and it is quite inconvenient to carry and preserve such paper business card. Electronic business cards tend to overcome such shortcomings. In one example, electronic business cards can be stored in mobile terminals which are portable, so it is convenient to carry and preserve electronic business cards and the problem of inconvenience in carrying and preservation of business cards can be solved.

However, exchanging electronic business cards which are used at present is performed by inputting information manually, i.e. manually inputting the information of the electronic business cards exchanged from others into devices, such as mobile phones. As the electronic business cards includes a relatively large amount of information including, for example, names, fixed phone numbers, mobile phone numbers and emails, etc., the inputting operation executed by users may be excessive when exchanging the electronic business cards, and the process of exchanging the electronic business cards may be complex.

SUMMARY

Embodiments of the present disclosure provide methods, apparatuses, and systems for exchanging electronic business cards. The methods, the apparatuses, and the systems are directed to solve one or more problems set forth above and other problems, so that the process of exchanging electronic business cards can be simplified.

A method for exchanging electronic business cards provided by embodiments of the present disclosure includes:

receiving a first request message sent by a first terminal, the first request message including a first condition information, a first electronic business card, and a first location information of the first terminal;

selecting a second request message from at least one request message received during a preset period of time, according to the first location information, the first condition information and the time when the first request message was received;

sending an electronic business card corresponding to the second request message to the first terminal; and sending the first electronic business card to a second terminal, the second request message being sent by the second terminal.

A method for exchanging electronic business cards provided by embodiments of the present disclosure includes:

sending a first request message to a server, the first request message including a first condition information, a first electronic business card, and a first location information of a first terminal, such that the server selects a second request message from at least one request message received during a preset period of time, according to the first location information, the first condition information and the time when the first request message was received, then sends the first electronic business card to a second terminal, the second request message being sent by the second terminal;

receiving an electronic business card corresponding to the second request message.

A method for exchanging electronic business cards provided by embodiments of the present disclosure includes:

sending, by a first terminal, a first request message to a server, the first request message including a first condition information, a first electronic business card, and a first location information of the first terminal;

selecting, by the server, a second request message from at least one request message received during a preset period of time, according to the first location information, the first condition information and the time when the first request message was received;

sending, by the server, an electronic business card corresponding to the second request message to the first terminal; and sending, by the server, the first electronic business card to a second terminal, the second request message being sent by the second terminal.

An apparatus for exchanging electronic business cards provided by embodiments of the present disclosure includes: a receiving unit, a selecting unit, a first sending unit and a second sending unit.

The receiving unit is configured for receiving a first request message sent by a first terminal, wherein the first request message includes a first condition information, a first electronic business card, and a first location information of the first terminal;

The selecting unit, is configured for selecting a second request message from at least one request message received during a preset period of time, according to the first location information, the first condition information and the time when the first request message was received;

The first sending unit, is configured for sending an electronic business card corresponding to the second request message to the first terminal;

The second sending unit, is configured for sending the first electronic business card to a second terminal, the second request message being sent by the second An apparatus for exchanging electronic business cards provided by embodiments of the present disclosure includes: a sending unit and a receiving unit.

The sending unit, is configured for sending a first request message for requesting for exchanging of electronic business cards to a server, wherein the first request message includes a first condition information, a first electronic business card and a first location information of the apparatus for exchanging electronic business cards, such that the server selects a second request message from at least one request message received during a preset period of time, according to the first location information, the first condition information and the time when the first request message was received, then sends the first electronic business card to a destination terminal, wherein the second request message was sent by the destination terminal;

The receiving unit, is configured for receiving an electronic business card corresponding to the second request message.

A system for exchanging electronic business cards provided by embodiments of the present disclosure includes a first terminal and a server.

The first terminal, is configured for sending a first request message for requesting for exchanging of electronic business cards to the server, wherein the first request message includes a first condition information, a first electronic business card, and a first location information of the first terminal;

The server, is configured for selecting a second request message from at least one request message received during a preset period of time, according to the first location information, the first condition information and the time when the first request message was received; and sending, by the server, an electronic business card corresponding to the second request message to the first terminal, and sending the first electronic business card to a second terminal, the second request message being sent by the second terminal.

As should be understood from the above technical solutions, according to the embodiments of the present disclosure, after the first request message sent by the first terminal for requesting for exchanging of electronic business cards is received, the second request message may be selected from at least one request message received during a preset period of time, according to the time when the first request message was received, and the first location information and the first condition information both included in the first request message; then an electronic business card corresponding to the second request message may be sent to the first terminal. In this way, the exchange of electronic business cards can be achieved by sending the first request message to users, thus process of exchanging electronic business cards is simplified.

BRIEF DESCRIPTION OF THE DRAWINGS

FIG. 3 is an exemplary flowchart of still another method for exchanging electronic business cards in accordance with an embodiment of the present disclosure.

FIG. 4 is a sequence diagram illustrating the interaction between a first terminal and a server in still another method for exchanging electronic business cards in accordance with an embodiment of the present disclosure.

DETAILED DESCRIPTION OF ILLUSTRATED EMBODIMENTS

Reference throughout this specification to "one embodiment" "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
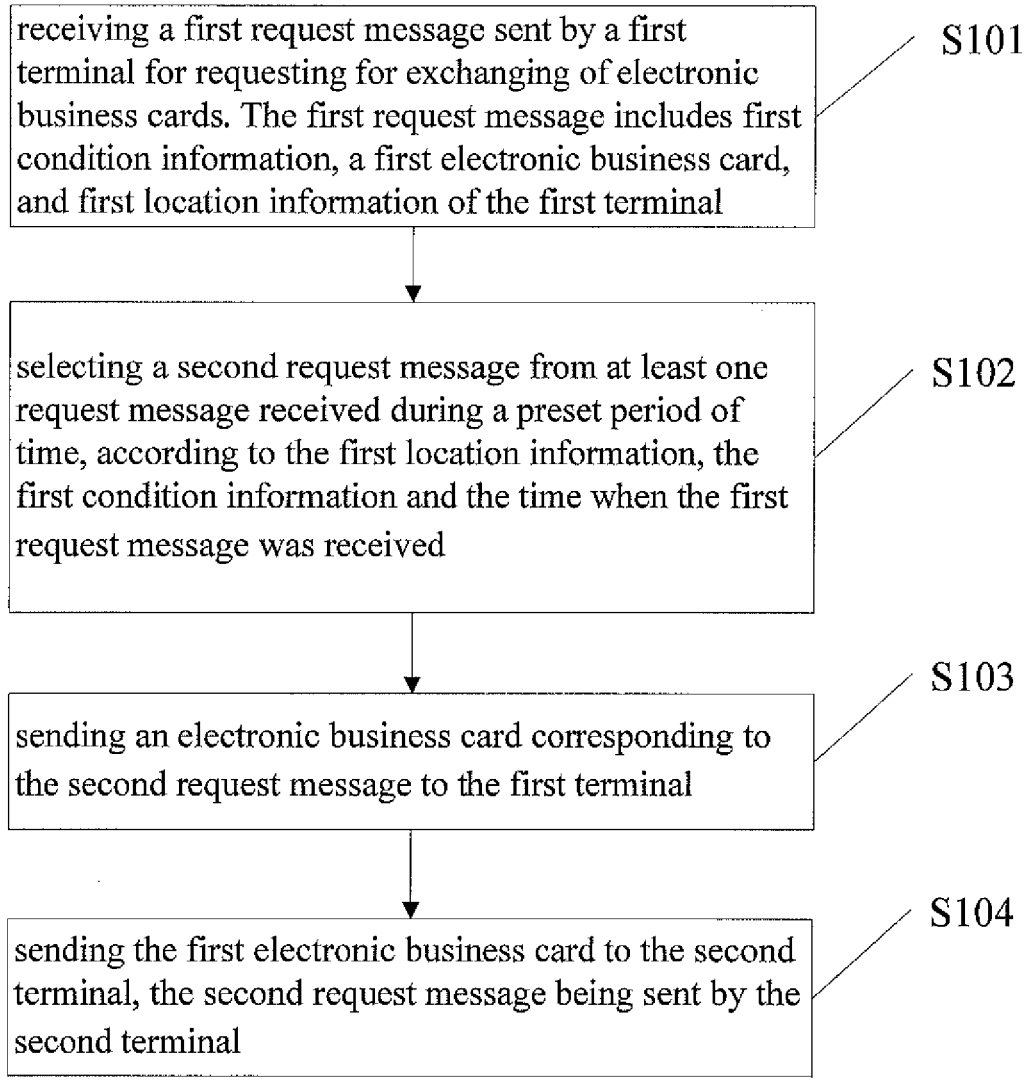
FIG. 1 is an exemplary flowchart of a method for exchanging electronic business cards in accordance with an embodiment of the present disclosure.

FIG. 1 is an exemplary flowchart of a method for exchanging electronic business cards, in accordance with an embodiment of the present disclosure. As shown in FIG. 1, the method includes:

Step S141, receiving a first request message sent by a first terminal for requesting for exchanging of electronic business cards. The first request message includes first condition information, a first electronic business card, and first location information of the first terminal.

In this embodiment, the first location information may refer to the location information of the first terminal, that is, the first location information is used to indicate a current location of the first terminal. The first condition information specifically may be the condition information generated by the first terminal, and the format of the condition information is not limited in this embodiment. The condition information may include:

condition information, generated by the first terminal which receives operations inputted by users, such as text or picture information, generated by receiving operations inputted by users, like verification information or password information.

In alternative embodiments, the condition information may include:

condition information, generated by the first terminal which monitors the external environment of the first terminal, for indicating the external environment.

For example, the condition information generated by the first terminal which monitors the external environment of the first terminal, for indicating the external environment, may include:

audio information, generated by the first terminal which records the sound of the external environment of the first terminal, or optical information, generated by the first terminal which monitors the light intensity of the external environment of the first terminal.

In this embodiment, the first terminal may monitor the external environment via hardware devices. In one example, the first terminal may record the sound of the external environment of the first terminal via recording equipment, thereby generate the audio information. In another example, the first terminal may sense the sound of the external environment of the first terminal via sound sensors and store it, thus generate the audio information.

In still another example, the first terminal may monitor the light intensity of the external environment of the first terminal via an optical sensor, thereby generate the optical information.

Step S102, selecting a second request message from at least one request message received during a preset period of time, according to the first location information, the first condition information and the time when the first request message was received.

After the step S102 is executed, an electronic business card corresponding to the second request message may be selected to send to the first terminal. In this embodiment, the preset period of time may be an assemblage of time. The difference between the receiving time of the first request message and the time included in the assemblage is equal to or less than a predetermined difference of time. For example, when the first request message is received at 10:00:00, and the predetermined difference of time is 10 seconds, then the preset period of time may be 09:59:50-10:00:10.

The second request message includes condition information, an electronic business card, and location information of the second terminal. The location information included in the second request message is used to indicate the location of the second terminal. The condition information included in the second request message may refer to:

condition information generated by the second terminal which receives operations inputted by users, or generated by the second terminal which monitors the external environment of the second terminal, for indicating the external environment.

In one example, the condition information for indicating the external environment, generated by the second terminal which monitors the external environment of the second terminal, may include:

audio information, generated by the second terminal which records the sound of the external environment of the second terminal; or optical information, generated by the second terminal which monitors the light intensity of the external environment of the second terminal.

In this embodiment, the second request message may need to satisfy the following conditions:

receiving the second request message during the preset period of time, for instance, if the preset period of time may refer to an assemblage of time, the difference between the receiving time of the first request message and the time included in the assemblage is equal to or less than a predetermined difference of time, and the first request message is received at 10:00:00 and the predetermined difference of time is 10 seconds, then the preset period of time may be 09:59:50-10:00:10 and the second request message should be received during the preset period of time. If the second request message satisfies the above conditions, the exchange of electronic business cards by sending a first request message or a second request message may be achieved when the exchange is needed among several users.

The distance between the location indicated by the location information of the second terminal and location indicated by the location information of the first terminal is less than a preset distance. For example, the location information of the second request message indicates a location B and that means the location of the second terminal is location B, and the first location information indicates a location A and that means the location of the first terminal is location A. If the preset distance is 100 meters, then it may be noted that distance between the location B and the location A is less than 100 meters, for example the location B and the location A may be in a same office. The second request messages may include one or a number of request messages. In other words, if the request message is received during the preset period of time, the distance between the location indicated by the location information included in the request message and the location indicated by the first location information is less than the preset distance, and the similarity between the condition information included in the request message and the first condition information is greater than a preset threshold, then this request message can be selected as the second request message. Accordingly, the terminal sending such second request message can be referred to as the second terminal.

In this embodiment, about the similarity between the condition information included in the second request message and the first condition information being greater than a preset threshold, it could be better understood with reference to the following examples. For instance, in one example, if the first condition information is text or picture information, then the condition information included in the second request message may be also text or picture information, and the similarity between the text or picture information and the text or the picture information of the first condition information may be greater than a preset threshold. For example, if the first condition information is the text "ABC", and the condition information included in the second request message is also the text "ABC", then the similarity between the condition information included in the second request message and the first condition information is greater than a preset threshold. For example, if the first condition information is first audio information, then the condition information included in the second request message may be second audio information, and the similarity between the first audio information and the second audio information is greater than a preset threshold. For example, if the first audio information represents a quiet environment, and the second audio information also represents a quiet environment, then the similarity between the condition information included in the second request message and the first condition information is greater than a preset threshold.

It is noted, the preset period of time, the preset distance, and the preset threshold mentioned above may be preset by users. For example, the preset period of time refers to an assemblage of time and the difference between the time and the receiving time of the first request message is equal to or less than a predetermined difference of time, and the predetermined difference of time may be 5 seconds, 10 seconds, or 15 seconds, etc. The preset distance may be 20 meters, 50 meters, and 100 meters, etc. The preset threshold may be 80%, 90%, or 95%, etc.

Step S103, sending an electronic business card corresponding to the second request message to the first terminal.

Step S104, sending the first electronic business card to the second terminal, the second request message being sent by the second terminal.

The second request message may include one or a number of request messages. Accordingly, the electronic business card sent in Step S103 may include one or a number of electronic business cards.

The first terminal and the second terminal may be any devices with communication and storage function, such as: tablet computers, mobile phones, e-readers, remote controls, personal computers (PC), notebook computers, automotive equipment, network TV, wearable devices, and any other network-enabled smart devices.

This embodiment may be applied to any devices with communication and storage function. The devices (terminals) may be used to achieve the above methods, including: servers, tablet computers, mobile phones, e-readers, remote control, PCs, notebook computers, automotive equipment, network television, wearable devices and other smart devices with networking capabilities.

In this embodiment, after the first request message sent by the first terminal for requesting for exchanging of electronic business cards is received, the second request message may be selected from at least one request message received during a preset period of time, according to the time when the first request message was received, the first location information and the first condition information included in the first request message. Then an electronic business card included in the second request message may be sent to the first terminal. In this way, the exchange of electronic business cards can be achieved by sending the first request message from the first terminal, and the process of exchanging electronic business cards is simplified.

Figure 2:
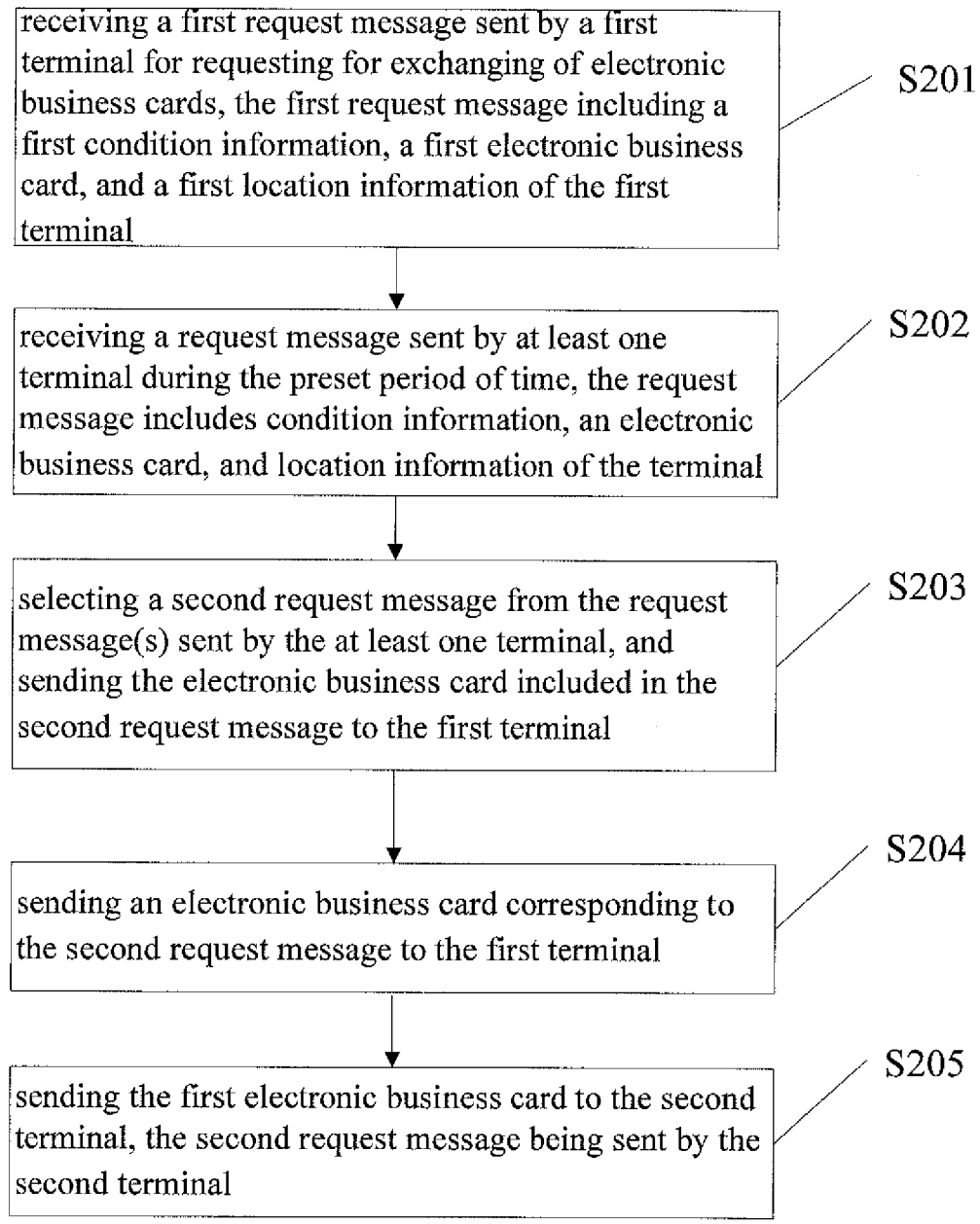
FIG. 2 is an exemplary flowchart of another method for exchanging electronic business cards in accordance with an embodiment of the present disclosure.

FIG. 2 is an exemplary flowchart of another method for exchanging electronic business cards, in accordance with an embodiment of the present disclosure. As shown in FIG. 2, the method includes:

Step S201, receiving a first request message sent by a first terminal for requesting for exchanging of electronic business cards, the first request message including a first condition information, a first electronic business card, and a first location information of the first terminal.

In this embodiment, the first location information may refer to the location information of the first terminal, that is, the first location information is used to indicate a current location of the first terminal. The first condition information specifically may be the condition information generated by the first terminal and the format of the condition information is not limited in this embodiment. The condition information in this embodiment may include:

condition information generated by the first terminal which receives operations inputted by users, such as text or picture information, generated by receiving operations inputted by users, like verification information or password information.

In alternative embodiments, the condition information may include:

condition information, generated by the first terminal which monitors the external environment of the first terminal, for indicating the external environment.

For example, the condition information generated by the first terminal which monitors the external environment of the first terminal, for indicating the external environment may include:

audio information, generated by the first terminal which records the sound of the external environment of the first terminal, or optical information, generated by the first terminal which monitors the light intensity of the external environment of the first terminal.

In this embodiment, the first terminal may monitor the external environment via hardware devices. In one example, the first terminal may record the sound of the external environment of the first terminal via recording equipment, thereby generate the audio information. In another example, the first terminal may sense the sound of the external environment of the first terminal via sound sensors and store it, thus generate the audio information.

In still another example, the first terminal may monitor the light intensity of the external environment of the first terminal via an optical sensor, thereby generate the optical information.

Step S202, receiving a request message sent by at least one terminal during the preset period of time, the request message includes condition information, an electronic business card, and location information of the terminal.

The preset period of time may be an assemblage of time, the difference between the receiving time of the first request message and the time included in the assemblage is equal to or less than a predetermined difference of time. For example, when the first request message is received at 10:00:00, and the predetermined difference of time is 10 seconds, then the preset period of time may be 09:59:50-10:00:10.

In this embodiment, an execution sequence of the step S201 and step S202 is not limited. In addition, the step S202 may be executed separately. For example, the preset period of time includes a first period of time and a second period of time, and the first period of time is earlier than the time when the first request message is received. The second period of time is later than the time when the first request message is received. Accordingly, the step S202 may include:

Step (1): receiving request message(s) sent by at least one terminal during a first period of time, the request message includes condition information, an electronic business card, and location information of the terminal; and Step (2): receiving request message(s) sent by at least one terminal during a second period of time, the request message includes condition information, an electronic business card, and location information of the terminal.

In this embodiment, the step (1) may be executed before step S201, or may be executed with step S201 simultaneously; similarly, the step (2) may be executed after step S201, or may be executed with step S201 simultaneously.

Step S203, selecting a second request message from the request message(s) sent by the at least one terminal, and sending the electronic business card included in the second request message to the first terminal. In this embodiment, the distance between the location indicated by the first location information and the location indicated by the location information of the second terminal is less than a preset distance. In addition, the similarity between the first condition information and the condition information included in the second request message is greater than a preset threshold.

In this embodiment, the condition information included in the second request message in this embodiment may include:

condition information generated by the second terminal which receives operations inputted by users; or condition information generated by the second terminal which monitors the external environment of the second terminal, for indicating the external environment.

In one example, the condition information for indicating the external environment, generated by the second terminal which monitors the external environment of the second terminal may include:

audio information, generated by the second terminal which records the sound of the external environment of the second terminal; or optical information, generated by the second terminal which monitors the light intensity of the external environment of the second terminal.

In this embodiment, the second request message may need to satisfy the following conditions:

receiving the second request message during the preset period of time, for instance, if the preset period of time may refer to an assemblage of time, the difference between the receiving time of the first request message and the time included in the assemblage is equal to or less than a predetermined difference of time, and the first request message is received at 10:00:00, and the predetermined difference of time is 10 seconds, then the preset period of time may be 09:59:50-10:00:10 and the second request message should be received during the preset period of time. If the second request message satisfies the above conditions, the exchange of electronic business cards by sending a first request message or a second request message may be achieved when the exchange is needed among several users.

The distance between the location indicated by the first location information and the location indicated by the location information of the second terminal is less than a preset distance. For example, the location information of the second request message indicates a location B and that means the location of the second terminal is location B, and the first location information indicated a location A and that means the location of the first terminal is location A. If the preset distance is 100 meters, then it may be noted that distance between the location B and the location A is less than 100 meters, for example the location B and the location A may be probably in a same office. The second request messages may be one or a number of request messages. In other words, if the request message is received during the preset period of time, the distance between the location indicated by the location information included in the request message and the location indicated by the first location information is less than the preset distance, and the similarity between the condition information included in the request message and the first condition information is greater than a preset threshold, then this request message can be selected as the second request message. Accordingly, the terminal sending such second request message can be referred to as the second terminal.

In this embodiment, about the similarity between the first condition information and the second condition information being greater than a preset threshold, it could be better understood with reference to the following examples. For instance, in one example, if the first condition information is text or picture information, then the condition information included in the second request message may be also text or picture information, and the similarity between the text or picture information and the text or the picture information of the first condition information may be greater than a preset threshold. For example, if the first condition information is the text "ABC", and the condition information included in the second request message is also be text "ABC", then the similarity between the condition information included in the second request message and the first condition information is greater than a preset threshold. In another example, if the first condition information is the first audio information, then the condition information included in the second request message may be the second audio information, and the similarity between the first audio information and the second audio information is greater than a preset threshold. For example, if the first audio information represents a quiet environment, while the second audio information represents a quiet environment, then the similarity between the condition information included in the second request message and the first condition information is greater than a preset threshold.

It is noted that, the preset period of time, the preset distance, and the preset threshold mentioned above may be pre-set by users. For example, the preset period of time refers to an assemblage of time and the difference between the time and the receiving time of the first request message is equal to or less than a predetermined difference of time, and the predetermined difference of time may be 5 seconds, 10 seconds, or 15 seconds, etc. The preset distance may be 20 meters, 50 meters, and 100 meters, etc. The preset threshold may be 80%, 90%, or 95%, etc.

In this embodiment, the step S203 may include:

storing the request message(s) sent by the at least one terminal, and generating time information of each request massage, the time information is used to indicate the time when the request massage is received.

selecting a second request message from request messages with the time information indicating their receiving time is in the preset period of time, and sending the electronic business card included in the second request message to the first terminal.

In this embodiment, the location information may include at least one of;

location information of GPS (Global Positioning System), address information of media access control (MAC) in wireless network (e.g.: WiFi network), a base station (Cell) ID, IP address, etc.

Step S204, sending an electronic business card corresponding to the second request message to the first terminal.

Step S205, sending the first electronic business card to the second terminal, the second request message being sent by the second terminal.

The second request message may include one or a number of request messages. Accordingly, the electronic business card sent in Step S204 may include one or a number of electronic business cards.

The first terminal and the second terminal may be any devices with communication and storage function, such as: tablet computers, mobile phones, e-readers, remote controls, PCs, notebook computers, automotive equipment, network TV, wearable devices, and any other network-enabled smart devices.

This embodiment may be applied to any devices with communication and storage function. The devices (terminals) may be used to achieve the above methods, including: servers, tablet computers, mobile phones, e-readers, remote control, PCs, notebook computers, automotive equipment, network television, wearable devices and other smart devices with networking capabilities.

Upon the embodiment, there are many alternative embodiments for this technical solution, and the embodiments could achieve the exchange of electronic business cards and simplify the process of exchanging electronic business cards.

FIG. 3 is an exemplary flowchart of another method for exchanging electronic business cards, in accordance with an embodiment of the present disclosure. The method may be applied on a first terminal, and as shown in FIG. 3 includes step S301 and S302.

Step S301, sending a first request message for requesting for exchanging of electronic business cards to a server, the first request message includes a first condition information, a first electronic business card, and a first location information of the first terminal, such that the server selects a second request message from at least one request message received during a preset period of time, according to the first location information, the first condition information, and the time when the first request message was received, and sending the first electronic business card to the second terminal, the second request message being sent by the second terminal.

In this embodiment, the first location information may refer to the location information of the first terminal, that is, the first location information is used to indicate a current location of the first terminal. The first condition information specifically may be the condition information generated by the first terminal, and the format of the condition information is not limited in this embodiment. The condition information may include:

condition information generated by the first terminal which receives operations inputted by users, such as text or picture information, generated by receiving operations inputted by users, like verification information or password information.

In alternative embodiments, the condition information may include:

condition information, generated by the first terminal which monitors the external environment of the first terminal, for indicating the external environment.

For example, the condition information generated by the first terminal which monitors the external environment of the first terminal, for indicating the external environment may include:

audio information, generated by the first terminal which records the sound of the external environment of the first terminal, or optical information, generated by the first terminal which monitors the light intensity of the external environment of the first terminal.

In this embodiment, the first terminal may monitor the external environment via hardware devices. In one example, the first terminal may record the sound of the external environment of the first terminal via recording equipment, thereby generate audio information. In another example, the first terminal may sense the sound of the external environment of the first terminal via sound sensors and store it, thus generate the audio information.

In still another example, the first terminal may monitor the light intensity of the external environment of the first terminal via an optical sensor, thereby generate optical information.

After the server receives the first request message, an electronic business card corresponding to the second request message may be selected to send to the first terminal. The second request message includes condition information, an electronic business card, and location information of the second terminal. In this embodiment, the location information included in the second request information is used to indicate the location of the second terminal.

In this embodiment, the condition information included in the second request message may include:

condition information generated by the second terminal which receives operations inputted by users; or condition information generated by the second terminal which monitors the external environment of the second terminal, for indicating the external environment.

In one example, the condition information for indicating the external environment, generated by the second terminal which monitors the external environment of the second terminal, for indicating the external environment of the second terminal, may include:

audio information, generated by the second terminal which records the sound of the external environment of the second terminal; or optical information, generated by the second terminal which monitors the light intensity of the external environment of the second terminal.

In this embodiment, the second request message may need to satisfy the following conditions:

receiving the second request message during a period of time, for instance, if the preset period of time may refer to an assemblage of time, the difference between the receiving time of the first request message and the time included in the assemblage is equal to or less than a predetermined difference of time, and the first request message is received at 10:00:00 and the predetermined difference of time is 10 seconds, then the preset period of time may be 09:59:50-10:00:10 and the second request message should be received during the preset period of time. If the second request message satisfies the above conditions, the exchange of electronic business cards by sending a first request message or a second request message may be achieved when the exchange is needed among several users.

The distance between the location indicated by the location information of the second terminal and location indicated by the location information of the first terminal is less than a preset distance. For example, the location information of the second request message indicates a location B, and that means the location of the second terminal is location B, and the first location information A and that means the location of the first terminal is location A. If the preset distance is 100 meters, then it may be noted that distance between the location B and the location A is less than 100 meters, for example the location B and the location A may be in a same office. The second request messages may be one or a number of request messages. In other words, if the request message is received during the preset period of time, the distance between the location indicated by the location information included in the request message and the location indicated by the first location information is less than the preset distance, and the similarity between the condition information included in the request message and the first condition information is greater than a preset threshold, then this request message can be selected as the second request message. Accordingly, the terminal sending such second request message can be referred to as the second terminal.

In this embodiment, as regards the similarity between the condition information included in the second request message and the first condition information is greater than a preset threshold, it could be better understood with reference to the following examples. For instance, in one example, if the first condition information is text or picture information, then the condition information included in the second request message may be also text or picture information, and the similarity between the text or picture information and the text or the picture information of the first condition information may be greater than a preset threshold. For example, if the first condition information is the text "ABC", and the condition information included in the second request message is also the text "ABC", then the similarity between the condition information included in the second request message and the first condition information is greater than a preset threshold. In another example, if the first condition information is first audio information, and the condition information is second audio information, and the similarity between the first audio information and the second audio information is greater than a preset threshold. For example, if the first audio information represents a quiet environment, while the second audio information also represents a quiet environment, then the similarity between the condition information included in the second request message and the first condition information is greater than a preset threshold.

It is noted that, the preset period of time, the preset distance, and the preset threshold mentioned above may be pre-set by users. For example, the preset period of time refers to an assemblage of time and the difference between the time and the receiving time of the first request message is equal to or less than a predetermined difference of time, and the predetermined difference of time may be 5 seconds, 10 seconds, or 15 seconds, etc. The preset distance may be 20 meters, 50 meters, and 100 meters, etc. The preset threshold may be 80%, 90%, or 95%, etc.

Step S302, receiving an electronic business card corresponding to the second request message sent by the server.

In this embodiment, before the step S301, a registration step may be applied to register a client (terminal) for exchanging the electronic business card to a register device, i.e. executing the above-mentioned steps on the client (terminal). For example, the client (terminal) may send SMS verification information to a server. When the verification information is passed by the server, a confirmation message sent by the server for allowing the exchanging of the electronic business cards on the client may be received. After the client (terminal) receives the confirmation message, the client (terminal) may be used to apply the above method (including step S301 and S302).

In this embodiment, alternatively, the location information may include at least one of: location information of GPS (Global Positioning System), address information of media access control (MAC) in wireless network (e.g.: WiFi network), a base station (Cell) ID, IP address, etc.

The second terminal may be any devices with communication and storage function, such as: servers, tablet computers, mobile phones, e-readers, remote controls, personal computers (PC), notebook computers, automotive equipment, network TV, wearable devices, and any other network-enabled smart devices.

The server may be any devices with communication and storage function, such as: bases, tablet computers, mobile phones, c-readers, remote controls, personal computers (PC), notebook computers, automotive equipment, network TV, wearable devices, and any other network-enabled smart devices.

This embodiment may be applied to any devices with communication and storage function. The devices (terminals) may be used to achieve the above methods, including: servers, tablet computers, mobile phones, e-readers, remote control, PCs, notebook computers, automotive equipment, network television, wearable devices and other smart devices with networking capabilities.

In this embodiment, after sending the first request message to the server for requesting for exchanging of electronic business cards, an electronic business card sent from the server may be received. The electronic business card is corresponding to the second request message. The second request message is selected from at least one request message received by the server during a preset period of time, according to the first location information, the first condition information, and the time when the first request message of the server was received. In this way, the exchange of electronic business cards can be achieved by sending the first request message from the first terminal, and the process of exchanging electronic business cards is simplified.

FIG. 4 is a sequence diagram illustrating the interaction between a first terminal and a server in still another method for exchanging electronic business cards, in accordance with an embodiment of the present disclosure. As shown in FIG. 4, the method includes:

Step S401, sending, by a first terminal, a first request message for requesting for exchanging of electronic business cards to a server, the first request message including a first condition information, a first electronic business card, and first location information of the first terminal.

In this embodiment, the first location information may refer to the location information of the first terminal, that is, the first location information is used to indicate a current location of the first terminal. The first condition information specifically may be the condition information generated by the first terminal, and the format of the condition information is not limited in this embodiment. The condition information may include:

condition information, generated by the first terminal which receives operations inputted by users, such as text or picture information, generated by receiving operations inputted by users, like verification information or password information.

In alternative embodiments, the condition information may include:

condition information, generated by the first terminal which monitors the external environment of the first terminal, for indicating the external environment.

For example, the condition information generated by the first terminal which monitors the external environment of the first terminal, for indicating the external environment, may include:

audio information, generated by the first terminal which records the sound of the external environment of the first terminal, or optical information, generated by the first terminal which monitors the light intensity of the external environment of the first terminal.

In this embodiment, the first terminal may monitor the external environment via hardware devices. In one example, the first terminal may record the sound of the external environment of the first terminal via recording equipment, thereby generate audio information. In another example, the first terminal may sense the sound of the external environment of the first terminal via sound sensors and store it, thus generate audio information.

In still another example, the first terminal may monitor the light intensity of the external environment of the first terminal via an optical sensor, thereby generate the optical information.

Step S402, selecting, by the server, a second request message from at least one request message received during a preset period of time, according to the first location information, the first condition information, and the time when the first request message was received.

After step S402 is executed, an electronic business card corresponding to the second request message may be selected to send to the first terminal. In this embodiment, the preset period of time may be an assemblage of time, the difference between the receiving time of the first request message and the time included in the assemblage is equal to or less than a predetermined difference of time. For example, when the first request message is received at 10:00:00, and the predetermined difference of time is 10 seconds, then the preset period of time may be 09:59:50-10:00:10.

The second request message includes condition information, a second first electronic business card, and location information.

In this embodiment, the location information included in the second request message is used to indicate the location of the second terminal; the condition information included in the second request message may refer to:

condition information generated by the second terminal which receives operations inputted by users; or generated by the second terminal which monitors the external environment of the second terminal, for indicating the external environment.

In one example, the condition information for indicating the external environment, generated by the second terminal which monitors the external environment of the second terminal of the second terminal, may include:

audio information, generated by the second terminal which records the sound of the external environment of the second terminal; or optical information, generated by the second terminal which monitors the light intensity of the external environment of the second terminal.

In this embodiment, the second request message may need to satisfy the following conditions:

receiving the second request message during the preset period of time, for instance, if the preset period of time may refer to an assemblage of time, the difference between the receiving time of the first request message and the time included in the assemblage is equal to or less than a predetermined difference of time, and the first request message is received at 10:00:00 and the predetermined difference of time is 10 seconds, then the preset period of time may be 09:59:50-10:00:10 and the second request message should be received during the preset period of time. If the second request message satisfies the above conditions, the exchange of electronic business cards by sending a first request message or a second request message may be achieved when the exchange is needed among several users.

The distance between the location indicated by the location information of the second terminal and location indicated by the location information of the first terminal is less than a preset distance. For example, the location information of the second request message indicates a location B, i.e. the location of the second terminal is location B, and the first location of the first location information indicate location A, i.e. the location of the first terminal is location A. If the preset distance is 100 meters, then it may be noted that distance between the location B and the location A is less than 100 meters, for example the location B and the location A may be in a same office. The second request messages may include one or a number of request messages. In other words, if the request message is received during the preset period of time, the distance between the location indicated by the location information included in the request message and the location indicated by the first location information is less than the preset distance, and the similarity between the condition information included in the request message and the first condition information is greater than a preset threshold, then this request message can be selected as the second request message. Accordingly, the terminal sending such second request message can be referred to as the second terminal.

In this embodiment, about the similarity between the condition information included in the second request message and the first condition information being greater than a preset threshold, it could be better understood with reference to the following examples. For instance, in one example, if the first condition information is text or picture information, then the condition information included in the second request message may be also text or picture information, and the similarity between the text or picture information and the text or the picture information of the first condition information may be greater than a preset threshold. For example, if the first condition information is the text "ABC", and the condition information included in the second request message is the text "ABC", then the similarity between the condition information included in the second request message and the first condition information is greater than a preset threshold. In another example, if the first condition information is first audio information, then the condition information included in the second request message may be second audio information, and the similarity between the first audio information and the second audio information is greater than a preset threshold. For example, if the first audio information represents a quiet environment, and the second audio information also represents a quiet environment, then the similarity between the condition information included in the second request message and the first condition information is greater than a preset threshold.

It is noted, the preset period of time, the preset distance, and the preset threshold mentioned above may be pre-set by users. For example, the preset period of time refers to an assemblage of time and the difference between the time and the receiving time of the first request message is equal to or less than a predetermined difference of time, and the predetermined difference of time may be 5 seconds, 10 seconds, or 15 seconds, etc. The preset distance may be 20 meters, 50 meters, and 100 meters, etc. The preset threshold may be 80%, 90%, or 95%, etc.

Step S403, sending, by the server, an electronic business card corresponding to the second request message to the first terminal; and Step S404, sending, by the server, the first electronic business card to the second terminal, the second request message being sent by the second terminal.

The second request message may include one or a number of request messages. Accordingly, the electronic business card sent in Step S403 may include one or a number of electronic business cards.

In alternative embodiments, the method may include the following step:

The server receives a request message sent by at least one terminal during a preset period of time. The request message includes condition information, an electronic business card, and location information.

The preset period of time may include a first period of time and a second period of time, and the first period of time is earlier than the time when the first request message is received. The second period of time is later than the time when the first request message is received. Accordingly, the step S401 may include:

Step (1): the server receives request message(s) sent by at least one terminal during a first period of time, the request message includes condition information, an electronic business card, and a location information of the terminal; and Step (2): the server receives request message(s) sent by at least one terminal during a second period of time, the request message includes condition information, an electronic business card, and location information of the terminal.

In this embodiment, step S402 concludes: the server may select the second request message from the request message(s) sent by the at least one terminal, and sends the electronic business card included in the second request message to the first terminal.

The first terminal and the second terminal may be any devices with communication and storage function, such as: tablet computers, mobile phones, e-readers, remote controls, personal computers (PC), notebook computers, automotive equipment, network TV, wearable devices, and any other network-enabled smart devices.

The above server may be any devices with communication and storage function, such as: tablet computers, mobile phones, e-readers, remote control, PCs, notebook computers, automotive equipment, network television, wearable devices and other smart devices with networking capabilities.

In this embodiment, the first terminal sends the first request message to the server for requesting for exchanging of electronic business cards. The server selects the second request message from at least one request message received during a preset period of time, according to the first location information, the first condition information, and the time when the first request message was received. Then the electronic business card included in the second request message may be sent by the server to the first terminal. In this way, the exchange of electronic business cards can be achieved by sending the first request message from the first terminal, thus the process of exchanging electronic business cards is simplified.

The following illustrates an application scenario in details.

A number of users are located in a same office, and each user has a portable terminal. In other words, a number of terminals are located in the same office. When the users want to exchange electronic business cards, they may use their own terminals to send respective request messages to a server. The request message includes condition information, an electronic business card, and location information of the terminal. When the receiving these request messages, the server may select some terminals into a terminal group for exchanging electronic business cards there between The similarity between the condition information sent by the selected terminals is greater than a preset threshold, and the distance between the locations indicated by the location information sent by the selected terminals is less than a preset distance. In one example, the server sends the electronic business card of a terminal in the terminal group to the other terminals in the terminal group, then the server sends the electronic business card of another terminal in the terminal group to the other terminals in the terminal group, and so forth, until the electronic business cards of all the terminals in the terminal group are exchanged. In this way, exchanging of electronic business cards between terminals in a same office can be achieved.

The following embodiments illustrate apparatuses of the present disclosure. The apparatuses in the following embodiments may be used to execute the methods disclosed in the first to fourth embodiments. It is noted, the following embodiments only illustrate the relevant part of the above embodiments. The undisclosed technical details can be understood with the reference to the first, the second, the third, and the fourth embodiments of the present disclosure.

Figure 5:
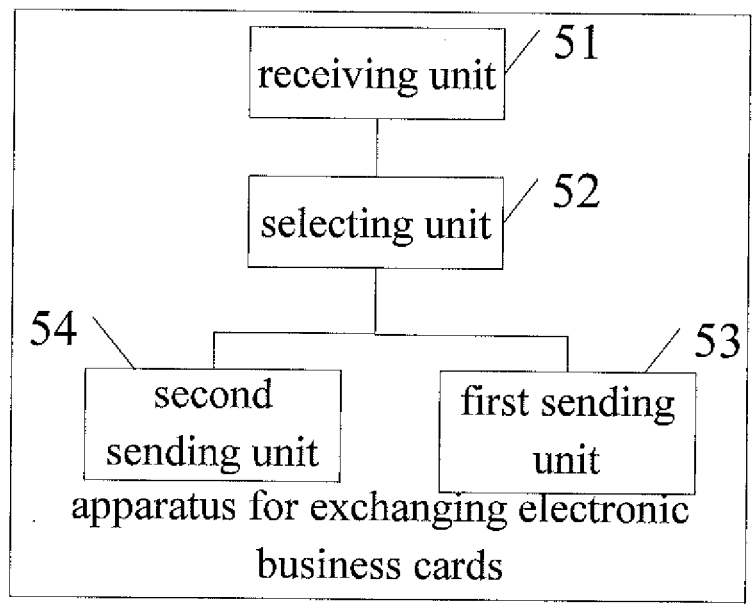
FIG. 5 is a block diagram of an apparatus for exchanging electronic business cards, in accordance with an embodiment of the present disclosure.

FIG. 5 is a block diagram of an apparatus for exchanging electronic business cards, in accordance with an embodiment of the present disclosure. As shown in FIG. 5, the apparatus includes: a receiving unit 51, a selecting unit 52, a first sending unit 53, and a second sending unit 54.

The receiving unit 51 is configured to receive a first request message sent by a first terminal for requesting for exchanging of electronic business cards, the first request message includes first condition information, a first electronic business card, and first location information of the first terminal.

In this embodiment, the first location information may refer to a location of the first terminal, that is, the first location information is used to indicate a current location of the first terminal. The first condition information may be the condition information generated by the first terminal. The format of the condition information is not limited in this embodiment. The first condition information in this embodiment may include: condition information generated by the first terminal which receives operations inputted by users, such as text or picture information, generated by receiving operations inputted by users, like verification information or password information.

In alternative embodiments, the condition information includes:

condition information, generated by the first terminal which monitors the external environment of the first terminal, for indicating the external environment.

For example, the condition information generated by the first terminal which monitors the external environment of the first terminal, for indicating the external environment, may include:

audio information, generated by the first terminal which records the sound of the external environment of the first terminal; or optical information, generated by the first terminal which monitors the light intensity of the external environment of the first terminal.

In this embodiment, the first terminal may monitor the external environment via hardware devices. In one example, the first terminal may record the sound of the external environment of the first terminal via recording equipment, thereby generate the audio information. In another example, the first terminal may sense the sound of the external environment of the first terminal via sound sensors, thus generate the audio information.

In still another example, the first terminal may monitor the light intensity of the external environment of the first terminal via an optical sensor, thus generate the optical information.

The selecting unit 52 is configured to select a second request message from at least one request message received during a preset period of time, according to the first location information, the first condition information, and the time when the first request message was received.

In this embodiment, an electronic business card corresponding to the second request message may be determined and sent to the first terminal. The preset period of time may be an assemblage of time, the difference between the receiving time of the first request message and the time included in the assemblage is equal to or less than a predetermined difference of time. For example, when the first request message is received at 10:00:00, and the predetermined difference of time is 10 seconds, then the preset period of time may be 09:59:50-10:00:10.

The second request message includes condition information, an electronic business card, and location information of the second terminal. The location information included in the second request message is used to indicate the location of the second terminal.

In this embodiment, the condition information included in the second request message may refer to:

condition information generated by the second terminal which receives operations inputted by users; or generated by the second terminal which monitors the external environment of the second terminal, for indicating the external environment.

In one example, the condition information for indicating the external environment, generated by the second terminal which monitors the external environment of the second terminal of the second terminal, may include:

audio information, generated by the second terminal which records the sound of the external environment of the second terminal; or optical information, generated by the second terminal which monitors the light intensity of the external environment of the second terminal.

In this embodiment, the second request message may need to satisfy the following conditions:

receiving the second request message during a period of time, for instance, if the preset period of time may refer to an assemblage of time, the difference between the receiving time of the first request message and the time included in the assemblage is equal to or less than a predetermined difference of time, and the first request message is received at 10:00:00 and the predetermined difference of time is 10 seconds, then the preset period of time may be 09:59:50-10:00:10 and the second request message should be received during the preset period of time. If the second request message satisfies the above conditions, the exchange of electronic business cards by sending a first request message or a second request message may be achieved when the exchange is needed among several users.

The distance between the location indicated by the location information of the second terminal and location indicated by the location information of the first terminal is less than a preset distance. For example, the location information of the second request message indicates a location B and that means the location of the second terminal is location B, and the first location information indicates a location A and that means the location of the first terminal is location A. If the preset distance is 100 meters, then it may be noted that distance between the location B and the location A is less than 100 meters, and the location B and the location A may be in a same office. The second request messages may include one or a number of request messages. In other words, if the request message is received during the preset period of time, the distance between the location indicated by the location information included in the request message and the location indicated by the first location information is less than the preset distance, and the similarity between the condition information included in the request message and the first condition information is greater than a preset threshold, then this request message can be selected as the second request message. Accordingly, the terminal sending such second request message can be referred to as the second terminal.

In this embodiment, about the similarity between the condition information included in the second request message and the first condition information being greater than a preset threshold, it could be better understood with reference to the following examples. For instance, in one example, if the first condition information is text or picture information, then the condition information included in the second request message may be also text or picture information, and the similarity between the text or picture information and the text or the picture information of the first condition information may be greater than a preset threshold. For example, if the first condition information is the text "ABC", and the condition information included in the second request message is also the text "ABC", then the similarity between the condition information included in the second request message and the first condition information is greater than a preset threshold. In another example, if the first condition information is first audio information, and then the condition information included in the second request message may be second audio information, and the similarity between the first audio information and the second audio information is greater than a preset threshold. For example, if the first audio information represents a quiet environment, and the second audio information also represents a quiet environment, then the similarity between the condition information included in the second request message and the first condition information is greater than a preset threshold.

It is noted, the preset period of time, the preset distance, and the preset threshold mentioned above may be pre-set by users. For example, the preset period of time refers to an assemblage of time and the difference between the time and the receiving time of the first request message is equal to or less than a predetermined difference of time, and the predetermined difference of time may be 5 seconds, 10 seconds, or 15 seconds, etc. The preset distance may be 20 meters, 50 meters, and 100 meters, etc. The preset threshold may be 80%, 90%, or 95%, etc.

The first sending unit 53 is configured to send the electronic business card included in the second request message to the first terminal.

The second sending unit 54 is configured to send the first electronic business card to the second terminal, the second request message being sent by the second terminal.

The second request message may include one or a number of request messages. Accordingly, the electronic business card sent by the first sending unit 53 may include one or a number of electronic business cards.

The receiving unit 51 may further be configured to receive request message(s) sent by at least one terminal during a preset period of time, the request message includes condition information, an electronic business card, and location information.

The preset period of time may include a first period of time and a second period of time, and the first period of time is earlier than the time when the first request message is received and the second period of time is later than the time when the first request message is received, i.e. the receiving unit 51 may further be configured to receive request message(s) sent by at least one terminal during a first period of time, the request message includes condition information, an electronic business card, and location information;

the receiving unit 51 may further be configured to receive request message(s) sent by at least one terminal during a second period of time, the request message includes condition information, an electronic business card, and location information.

The selecting unit 52 may further be configured to select a second request message from the request message(s) sent by the at least one terminal, and sends the electronic business card included in the second request message to the first terminal.

In this embodiment, the location information may include at least one of:

location information of GPS (Global Positioning System), address information of media access control (MAC) in wireless network (e.g.: WiFi network), a base station (Cell) ID, IP address, etc.

The first terminal and the second terminal may be any devices with communication and storage function, such as: tablet computers, mobile phones, e-readers, remote controls, personal computers (PC), notebook computers, automotive equipment, network TV, wearable devices, and any other network-enabled smart devices.

The apparatus for electronic business cards provided by the embodiment can be any devices with communication and storage function, such as: servers, tablet computers, mobile phones, e-readers, remote control, PCs, notebook computers, automotive equipment, network television, wearable devices and other smart devices with networking capabilities.

In this embodiment, after the first request message for requesting for exchanging electronic business cards sent by the first terminal is received, the second request message may be selected from at least one request message received during a preset period of time, according to the time when the first request message was received, the first location information, and the first condition information included in the first request message. Then an electronic business card included in the second request message may be sent to the first terminal. In this way, the exchange of electronic business cards can be achieved by sending the first request message from the first terminal, thus the process of exchanging electronic business cards is simplified.

Figure 6:
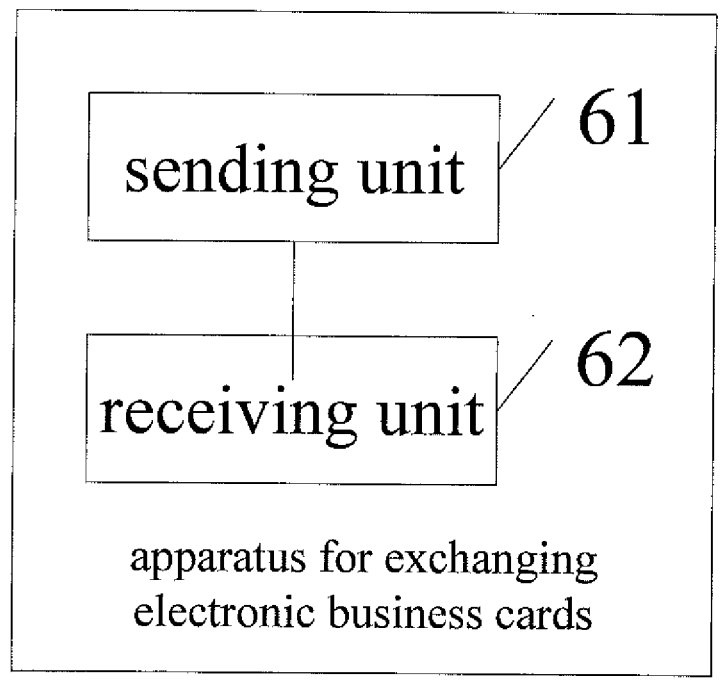
FIG. 6 is a block diagram of another apparatus for exchanging electronic business cards, in accordance with an embodiment of the present disclosure.

FIG. 6 is a block diagram of an apparatus for exchanging electronic business cards, in accordance with another embodiment of the present disclosure. As shown in FIG. 6, the apparatus includes a sending unit 61 and a receiving unit 62.

The sending unit 61 is configured to send a first request message for requesting for exchanging of electronic business cards to a server, the first request message includes first condition information, a first electronic business card, and first location information of the apparatus, such that the server selects a second request message from at least one request message received during a preset period of time, according to the first location information, the first condition information, and the time when the first request message was received, and sends the first electronic business card to a destination terminal, the second request message being sent by the destination terminal.

In this embodiment, the apparatus monitors the external environment of the apparatus to generate condition information for indicating the external environment, which may include:

the apparatus may record the sound of the external environment of the apparatus and generate audio information; or the apparatus may monitor the light intensity of the external environment of the apparatus and generate optical information.

In this embodiment, the apparatus monitors the external environment by hardware devices. In one example, the apparatus may record the sound of the external environment of the apparatus by using recording equipment, thus generate the audio information. In another example, the apparatus may sense the sound of the external environment of the apparatus by using sound sensors, thus generate the audio information.

In still another example, the apparatus may monitor the light intensity of the external environment by using an optical sensor, thus generate the optical information.

After the server receives the first request message, an electronic business card corresponding to the second request message may be determined to send to the apparatus. The second request message may include second condition information, an electronic business card, and location information of the destination terminal. In this embodiment, the location information of the second request message information is used to indicate a current location of the destination terminal.

In this embodiment, the condition information of the second request message information may include:

condition information generated by the first terminal which receives operations inputted by users; or condition information, generated by the destination terminal which monitors the external environment of the destination terminal, for indicating the external environment.

In one example, the condition information generated by the destination terminal which monitors the external environment of the destination terminal, for indicating the external environment, may include audio information, generated by the destination terminal which records the sound of the external environment of the destination terminal; or optical information, generated by the destination terminal which monitors the light intensity of the external environment of the destination terminal.

In this embodiment, the second request message may need to satisfy the following conditions:

receiving the second request message during a period of time, for instance, if the preset period of time may refer to an assemblage of time, the difference between the receiving time of the first request message and the time included in the assemblage is equal to or less than a predetermined difference of time, and the first request message is received at 10:00:00 and the predetermined difference of time is 10 seconds, then the preset period of time may be 09:59:50-10:00:10 and the second request message should be received during the preset period of time. If the second request message satisfies the above conditions, the exchange of electronic business cards by sending a first request message or a second request message may be achieved when the exchange is needed among several users.

The distance between the location indicated by the location information of the destination terminal and the location indicated by the first location information is less than a preset distance. For example, the location of the second request message indicates a location B, i.e. the location of the destination terminal is location B, and the first location information indicate a location A, i.e. the location of the apparatus is location A. If the preset distance is 100 meters, then it could be understood that the distance between the location B and the location A is less than 100 meters, and the location B and the location A may probably located in a same office. The second request messages may include one or a number of request messages. In other words, if the request message is received during the preset period of time, the distance between the location indicated by the location information included in the request message and the location indicated by the first location information is less than the preset distance, and the similarity between the condition information included in the request message and first condition information is greater than a preset threshold, then this request message can be selected as the second request message. Accordingly, the terminal sending such second request message can be referred to as the destination terminal.

In this embodiment, for the similarity between the first condition information and the second condition information being greater than a preset threshold, it could be better understood with reference to the following examples. For instance, in one example, if the first condition information is text or picture information, and then the condition information included in the second request message may be also text or picture information, and the similarity between the text or picture information and the text or the picture information of the first condition information may be greater than a preset threshold. For example, if the first condition information is text "ABC", and the condition information included in the second request message is also the text "ABC", then the similarity between the condition information included in the second request message and the first condition information is greater than a preset threshold. In another example, if the first condition information is first audio information, and then the condition information included in the second request message may be second audio information, and then the similarity between the first audio information and the second audio information is greater than a preset threshold. For example, if the first audio information represents a quiet environment, and the second audio information also represents a quiet environment, then the similarity between the condition information included in the second request message and the first condition information is greater than a preset threshold.

It is noted, the preset period of time, the preset distance, and the preset threshold may be pre-set by users. For example, the preset period of time refers to an assemblage of time and the difference between the time and the receiving time of the first request message is equal to or less than a predetermined difference of time, and the predetermined difference of time may be 5 seconds, 10 seconds, or 15 seconds, etc. The preset distance may be 20 meters, 50 meters, and 100 meters, etc. The preset threshold may be 80%, 90%, or 95%, etc.

The receiving unit 62 is configured to receive an electronic business card corresponding to the second request message sent by the server.

In this embodiment, the location information may include at least one of:

location information of GPS (Global Positioning System), address information of media access control (MAC) in wireless network (e.g.: WiFi network), a base station (Cell) ID, IP address, etc.

The destination terminal may be any devices with communication and storage function, such as: tablet computers, mobile phones, e-readers, remote controls, personal computers (PC), notebook computers, automotive equipment, network TV, wearable devices, and any other network-enabled smart devices.

The server may be any devices with communication and storage function, such as: bases, tablet computers, mobile phones, e-readers, remote controls, personal computers (PC), notebook computers, automotive equipment, network TV, wearable devices, and any other network-enabled smart devices.

The apparatus provided in the embodiment may be any devices with communication and storage function, including: servers, tablet computers, mobile phones, e-readers, remote control, PCs, notebook computers, automotive equipment, network television, wearable devices and other smart devices with networking capabilities.

In this embodiment, after sending the first request message for requesting for exchanging electronic business cards to the server, an electronic business card sent from the server may be received. The electronic business card is included in the second request message. The second request message is selected from at least one request message receiving by the server during a preset period of time, according to the first location information, the first condition information, and the time when the first request message was received. In this way, the exchange of electronic business cards can be achieved by sending the first request message from the apparatus, thus the process of exchanging electronic business cards is simplified.

Figure 7:
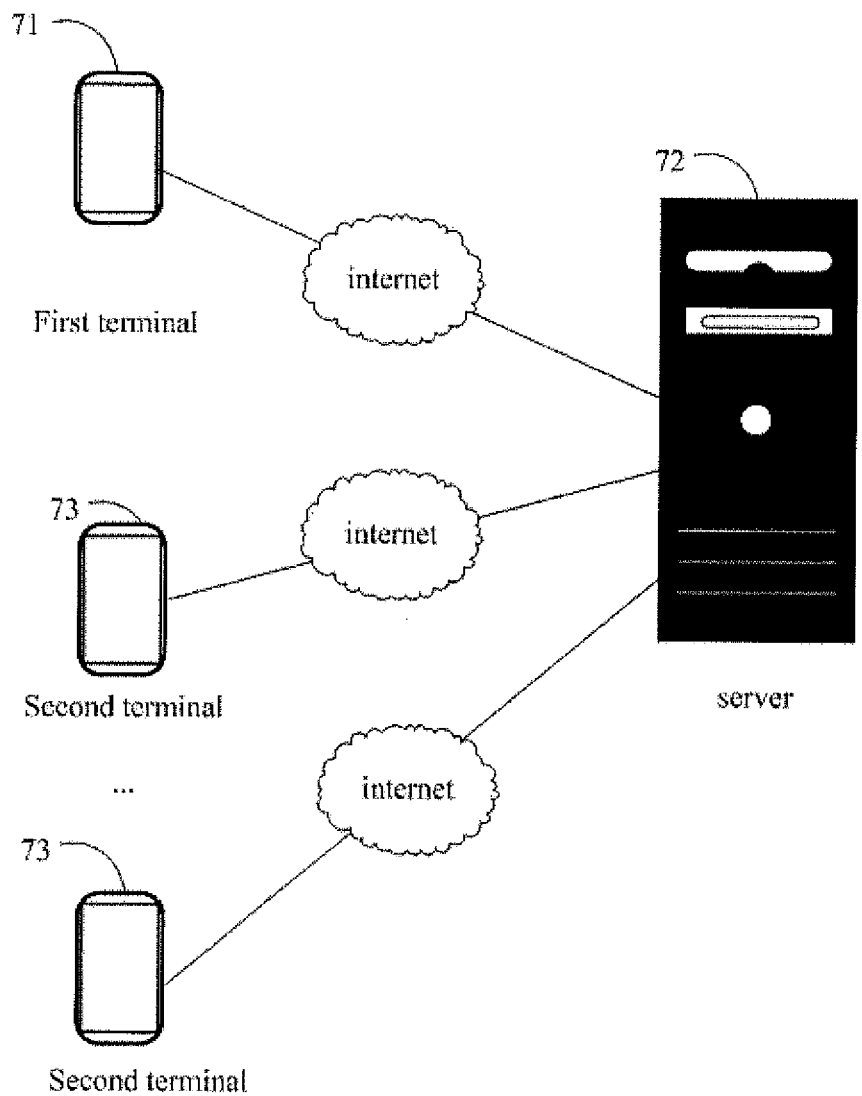
FIG. 7 is a block diagram of another apparatus for exchanging electronic business cards, in accordance with still an embodiment of the present disclosure.

FIG. 7 is a block diagram of a system for exchanging electronic business cards, in accordance with an embodiment of the present disclosure. In this embodiment, the system includes a first terminal 71 and a server 72, as shown in FIG. 7.

The first terminal 71 is configured to send a first request message to the server 72, the first request message includes first condition information, a first electronic business card, and first location information of the first terminal 71.

In this embodiment, the first location information may refer to the location of the first terminal 71, that is, the first location information is used to indicate a current location of the first terminal 71. The first condition information may be the one generated by the first terminal 71. The format of the condition information is not limited in this embodiment. The condition information in this embodiment may include:

condition information generated by the first terminal 71 which receives operations inputted by users, such as text or picture information, generated by receiving operations inputted by users, like verification information or password information.

In alternative embodiments, the condition information includes:

condition information, generated by the first terminal 71 which monitors the external environment of the first terminal 71, for indicating the external environment.

For example, the condition information generated by the first terminal 71 which monitors the external environment of the first terminal 71, for indicating the external environment includes:

audio information, generated by the first terminal which records the sound of the external environment of the first terminal; or optical information, generated by the first terminal which monitors the light intensity of the external environment of the first terminal.

In this embodiment, the first terminal 71 may monitor the external environment by hardware devices. In one example, the first terminal 71 may record the sound of the external environment of the first terminal 71 via recording equipment, thus generate audio information. In another example, the first terminal 71 may sense the sound of the external environment of the first terminal 71 by using sound sensors, thus generate audio information.

In still another example, the first terminal 71 may monitor the light intensity of the external environment of the first terminal 71 by using an optical sensor, thus generate optical information.

The server 72 is configured to select a second request message from at least one request message received during a preset period of time, according to the first condition information, the first location information, and the time when the first request message was received.

In this embodiment, the system further includes a second terminal 73.

The server 72 may be configured to send an electronic business card corresponding to the second request message to the first terminal 71; and also send the first electronic business card to the second terminal 73, the second request message being sent by the second terminal 73.

In this embodiment, the electronic business card corresponding to the second request message may be determined and sent to the first terminal 71 by the server 72. The second request message includes condition information, an electronic business card, and location information of the second terminal 73. The location information included in the second request message is used to indicate the location of the second terminal 73.

In this embodiment, the condition information included in the second request message may include:

condition information generated by the second terminal 73 which receives operations inputted by users; or condition information, generated by the second terminal 73 which monitors the external environment of the second terminal 73, for indicating the external environment.

In one example, the condition information generated by the second terminal 73 which monitors the external environment of the second terminal 73 may include:

audio information, generated by the second terminal 73 which records the sound of the external environment of the second terminal 73; or optical information, generated by the second terminal 73 which monitors the light intensity of the external environment of the second terminal 73.

In this embodiment, the second request message may need to satisfy the following conditions:

receiving the second request message during a period of time, for instance, if the preset period of time may refer to an assemblage of time, the difference between the receiving time of the first request message and the time included in the assemblage is equal to or less than a predetermined difference of time, and the first request message is received at 10:00:00 and the predetermined difference of time is 10 seconds, then the preset period of time may be 09:59:50-10:00:10 and the second request message should be received during the preset period of time. If the second request message satisfies the above conditions, the exchange of electronic business cards by sending a first request message or a second request message may be achieved when the exchange is needed among several users.

The distance between the location indicated by the location information of the second terminal 73 and the location indicated by the first location information is less than a preset distance. For example, the location information of the second request message indicates a location B, i.e. the location of the second terminal 73 is location B, and the first location information indicates a location A, i.e. the location of the first terminal 71 is location A. If the preset distance is 100 meters, then it may be noted that distance between the location B and the location A is less than 100 meters, and the location B and the location A may probably located in a same office. The second request messages may include one or a number of request messages. In other words, if the request message is received during the preset period of time, the distance of the location indicated by the location information included in the request message and the location indicated by the first location information is less than the preset distance, and the similarity between the condition information included in the request message and the first condition information is greater than a preset threshold, then this request message can be selected as the second request message. Accordingly, the terminal sending such second request message can be referred to as the second terminal 73.

In this embodiment, about the similarity between the condition information included in the second request message and the first condition information being greater than a preset threshold, it could be better understood with reference to the following examples. For instance, in one example, if the first condition information is text or picture information, and then the condition information included in the second request message is also text or picture information, and the similarity between the text or picture information and the text or the picture information of the first condition information may be greater than a preset threshold. For example, if the first condition information is the text "ABC", and the condition information included in the second request message is the text "ABC", then the similarity between the condition information included in the second request message and the first condition information is greater than a preset threshold. In another example, if the first condition information is first audio information, and then the condition information included in the second request message may be second audio information, and the similarity between the first audio information and the second audio information is greater than a preset threshold. For example, if the first audio information represents a quiet environment, and the second audio information also represents a quiet environment, then the similarity between the condition information included in the second request message and the first condition information is greater than a preset threshold.

It is noted, the preset period of time, the preset distance, and the preset threshold can be pre-set by the user. For example, the preset period of time refers to an assemblage of time and the difference between the time and the receiving time of the first request message is equal to or less than a predetermined difference of time, and the predetermined difference of time may be 5 seconds, 10 seconds, or 15 seconds, etc. The preset distance can be 20 meters, 50 meters, and 100 meters, etc. The preset threshold can be 80%, 90%, or 95%, etc.

The second request message may include one or a number of request messages. Accordingly, the electronic business card sent by the server 72 may include one or a number of electronic business cards. In addition, the first request message may include an electronic business card. Accordingly, the server 72 can also be configured to send the electronic business card included in the first request message to the second terminal 73, the second request message being sent by the second terminal 73. In this way, the exchange of the electronic business cards between the first terminal 71 and the second terminal 73 can be achieved.

In alternative embodiments, the server 72 may further be configured to receive a request message sent by at least one terminal during a preset period of time, the request message includes condition information, an electronic business card, and location information of the terminal.

The preset period of time may include a first period of time and a second period of time, and the first period of time is earlier than the time when the first request message is received and the second period of time is later than the time when the first request message is received. Accordingly, the server 72 can be used to receive request message(s) sent by at least one terminal during a first period of time. The request message includes condition information, an electronic business card, and location information.

In addition, the server 72 may be configured to receive request message(s) sent by at least one terminal during a second period of time. The request message includes condition information, an electronic business card, and location information.

In this embodiment, the server 72 may be configured to select a second request message from the request message(s) sent by the at least one terminal, and sends the electronic business card included in the second request message to the first terminal 71.

The first terminal 71 and the second terminal 73 can be any devices with communication and storage function, such as: tablet computers, mobile phones, e-readers, remote controls, personal computers (PC), notebook computers, automotive equipment, network TV, wearable devices, and any other network-enabled smart devices.

The above server 72 may be any devices with communication and storage function, such as: tablet computers, mobile phones, e-readers, remote control, PCs, notebook computers, automotive equipment, network television, wearable devices and other smart devices with networking capabilities.

In this embodiment, the first terminal 71 sends the first request message to the server 72. The server 72 selects the second request message from at least one request message received during a preset period of time, according to the first condition information, the first location information and the time when the first request message was received. Then the electronic business card included in the second request message can be sent by the server 72 to the first terminal 71. In this way, the exchange of electronic business cards can be achieved by sending the first request message from the first terminal 71, thus the process of exchanging electronic business cards is simplified.

The server 72, the apparatus (i.e. first terminal 71 or second terminal 72), and the system described above according to various embodiments are merely illustrative. The units/modules depicted as separate components may be or may not be physically separated. Components shown as units may be or may not be physical units. That is, they may be located in one place or may be distributed to multiple network units. According to practical needs, part or all of the units/modules can be selected to achieve the purpose according to various embodiments.

The methods, the server, the apparatus, and the system in accordance with various embodiments can be accomplished using a program/software to instruct related hardware. The hardware can include any suitable universal hardware, or any suitable specialized hardware including, e.g., specialized integrated circuits, specialized central processing unit (CPU), specialized memory, specialized components, etc. For example, the hardware can include personal computer, server, network device, etc. The program/software can be stored in a computer-readable storage medium including, e.g., ROM/RAM, magnetic disk, optical disk, etc.

The embodiments described above are merely preferred ones of the present disclosure but are not limitations to the protection scope of the present disclosure, and any variations or substitutions easily devised by those skilled in the art without departing from the spirit of the present disclosure fall within the scope of the protection. Therefore, the protection scope of the present disclosure shall be subject to that specified by the appended claims.

What is claimed is:

1. A method for exchanging electronic business cards, comprising:
    receiving a first request message sent by a first terminal, the first request message including first condition information, a first electronic business card, and first location information of the first terminal;
    selecting a second request message from at least one request message received during a preset period of time, according to the first location information, the first condition information and the time when the first request message was received;
    sending an electronic business card corresponding to the second request message to the first terminal; and
    sending the first electronic business card to a second terminal, the second request message being sent by the second terminal.

2. The method of claim 1, wherein the second request message comprises condition information and location information of the second terminal;
    wherein the distance between the location indicated by the location information of the second terminal and the location indicated by the first location information is less than a preset distance, and the similarity between the condition information included in the second request message and the first condition information is greater than a preset threshold.

3. The method of claim 2, wherein the first condition information comprises:
    condition information, generated by the first terminal receiving operations inputted by users; or condition information, generated by the first terminal monitoring the external environment of the first terminal, for indicating the external environment;
    the condition information included in the second request message refers to:
    condition information, generated by the second terminal receiving operations inputted by users; or condition information, generated by the second terminal monitoring the external environment of the second terminal, for indicating the external environment.

4. The method of claim 3, wherein the condition information generated by the first terminal monitoring the external environment of the first terminal for indicating the external environment refers to:
    audio information, generated by the first terminal recording the sound of the external environment of the first terminal; or optical information, generated by the first terminal monitoring the light intensity of the external environment of the first terminal; and
    the condition information generated by the second terminal monitoring the external environment of the second terminal for indicating the external environment refers to:
    audio information, generated by the second terminal recording the sound of the external environment of the second terminal; or optical information, generated by the second terminal monitoring the light intensity of the external environment of the second terminal.

5. The method of claim 1, wherein the first condition information comprises:
    condition information, generated by the first terminal receiving operations inputted by users; or condition information, generated by the first terminal monitoring the external environment of the first terminal, for indicating the external environment;
    the condition information included in the second request message refers to:
    condition information, generated by the second terminal receiving operations inputted by users; or condition information, generated by the second terminal monitoring the external environment of the second terminal, for indicating the external environment.

6. The method of claim 5, wherein the condition information generated by the first terminal monitoring the external environment of the first terminal for indicating the external environment refers to:
    audio information, generated by the first terminal recording the sound of the external environment of the first terminal; or optical information, generated by the first terminal monitoring the light intensity of the external environment of the first terminal; and
    the condition information generated by the second terminal monitoring the external environment of the second terminal for indicating the external environment refers to:
    audio information, generated by the second terminal recording the sound of the external environment of the second terminal; or optical information, generated by the second terminal monitoring the light intensity of the external environment of the second terminal.

7. A method for exchanging electronic business cards, comprising:
    sending, by a first terminal, a first request message to a server, the first request message including first condition information, a first electronic business card, and first location information of the first terminal;
    selecting, by the server, a second request message from at least one request message received during a preset period of time, according to the first location information, the first condition information and time when the first request message was received;
    sending, by the server, an electronic business card corresponding to the second request message to the first terminal;
    sending, by the server, the first electronic business card to the second terminal, the second request message being sent by the second terminal.

8. The method of claim 7, wherein the second request message comprises condition information and location information of the second terminal;
   wherein the distance between the location indicated by the location information of the second terminal and the location indicated by the first location information is less than a preset distance, and the similarity between the condition information included in the second request message and the first condition information is greater than a preset threshold.

9. The method of claim 8, wherein the first condition information comprises condition information, generated by the first terminal receiving operations inputted by users, or condition information, generated by the first terminal monitoring the external environment of the first terminal, for indicating the external environment;
   the condition information included in the second request message refers to:
   condition information, generated by the second terminal receiving operations inputted by users, or condition information, generated by the second terminal monitoring the external environment of the second terminal, for indicating the external environment.

10. The method of claim 9, wherein the condition information generated by the first terminal monitoring the external environment of the first terminal for indicating the external environment refers to:
   audio information, generated by the first terminal recording the sound of the external environment of the first terminal; or optical information, generated by the first terminal monitoring the light intensity of the external environment of the first terminal;
   the condition information generated by the second terminal monitoring the external environment of the second terminal for indicating the external environment refers to:
   audio information generated by the second terminal recording the sound of the external environment of the second terminal; or optical information, generated by the second terminal monitoring the light intensity of the external environment of the second terminal.

11. The method of claim 7, wherein the first condition information comprises condition information, generated by the first terminal receiving operations inputted by users, or condition information, generated by the first terminal monitoring the external environment of the first terminal, for indicating the external environment;
   the condition information included in the second request message refers to:
   condition information, generated by the second terminal receiving operations inputted by users, or condition information, generated by the second terminal monitoring the external environment of the second terminal, for indicating the external environment.

12. The method of claim 11, wherein the condition information generated by the first terminal monitoring the external environment of the first terminal for indicating the external environment refers to:
   audio information, generated by the first terminal recording the sound of the external environment of the first terminal; or optical information, generated by the first terminal monitoring the light intensity of the external environment of the first terminal;
   the condition information generated by the second terminal monitoring the external environment of the second terminal for indicating the external environment refers to:
   audio information generated by the second terminal recording the sound of the external environment of the second terminal; or optical information, generated by the second terminal monitoring the light intensity of the external environment of the second terminal.

13. An apparatus for exchanging electronic business cards, comprising:
   a processor; and
   a memory coupled to the processor, the memory having stored thereon software units executed by said processor, the software units comprising:
   a receiving unit, configured to receive a first request message sent by a first terminal, the first request message including a first condition information, a first electronic business card, and first location information;
   a selecting unit, configured to select a second request message from at least one request message received during a preset period of time, according to the first location information, the first condition information, and the time when the first request message is received;
   a first sending unit, configured to send an electronic business card corresponding to the second request message to the first terminal; and
   a second sending unit, configured to send the first electronic business card to a second terminal, the second request message being sent by the second terminal.

14. The apparatus of claim 13, wherein the second request message further comprises condition information and location information of the second terminal;
   wherein the distance between the location indicated by the location information of the second terminal and the location indicated by the first location information is less than a preset distance, and the similarity between the condition information included in the second request message and the first condition information is greater than a preset threshold.

15. The apparatus of claim 14, wherein the first condition information comprises condition information, generated by the first terminal receiving operations inputted by users; or condition information, generated by the first terminal monitoring the external environment of the first terminal, for indicating the external environment; and
   the condition information included in the second request information refers to:
   condition information generated by the second terminal receiving operations inputted by users; or condition information, generated by the second terminal monitoring the external environment of the second terminal.

16. The apparatus of claim 15, wherein the condition information generated by the first terminal monitoring the external environment of the first terminal refers to:
   audio information, generated by the first terminal recording the sound of the external environment of the first terminal; or optical information, generated by the first terminal monitoring the light intensity of the external environment of the first terminal; and
   the condition information generated by the second terminal monitoring the external environment of the second terminal refers to:
   audio information, generated by the second terminal recording the sound of the external environment of the second terminal; or optical information, generated by the second terminal monitoring the light intensity of the external environment of the second terminal.

17. The apparatus of claim 13, wherein the first condition information comprises condition information, generated by the first terminal receiving operations inputted by users; or condition information, generated by the first terminal monitoring the external environment of the first terminal, for indicating the external environment; and
the condition information included in the second request information refers to:
condition information generated by the second terminal receiving operations inputted by users; or condition information, generated by the second terminal monitoring the external environment of the second terminal.

18. The apparatus of claim 17, wherein the condition information generated by the first terminal monitoring the external environment of the first terminal refers to:
audio information, generated by the first terminal recording the sound of the external environment of the first terminal; or optical information, generated by the first terminal monitoring the light intensity of the external environment of the first terminal; and
the condition information generated by the second terminal monitoring the external environment of the second terminal refers to:
audio information, generated by the second terminal recording the sound of the external environment of the second terminal; or optical information, generated by the second terminal monitoring the light intensity of the external environment of the second terminal.

* * * * *